Dec. 26, 1939.   N. H. SCHNEIDER   2,184,889
LETTUCE TRIMMER
Filed Nov. 22, 1937   2 Sheets-Sheet 1
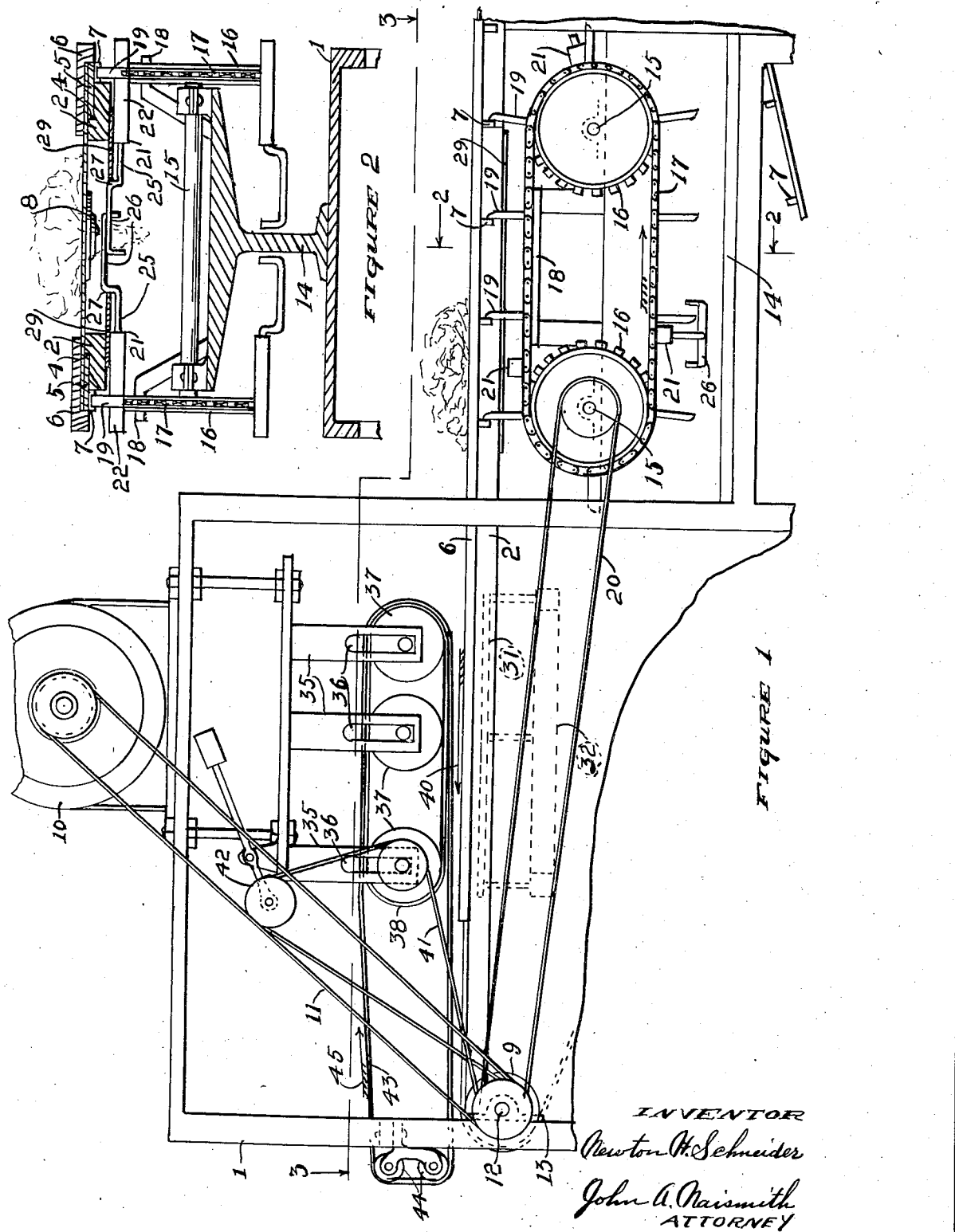

Dec. 26, 1939.  N. H. SCHNEIDER  2,184,889
LETTUCE TRIMMER
Filed Nov. 22, 1937  2 Sheets-Sheet 2
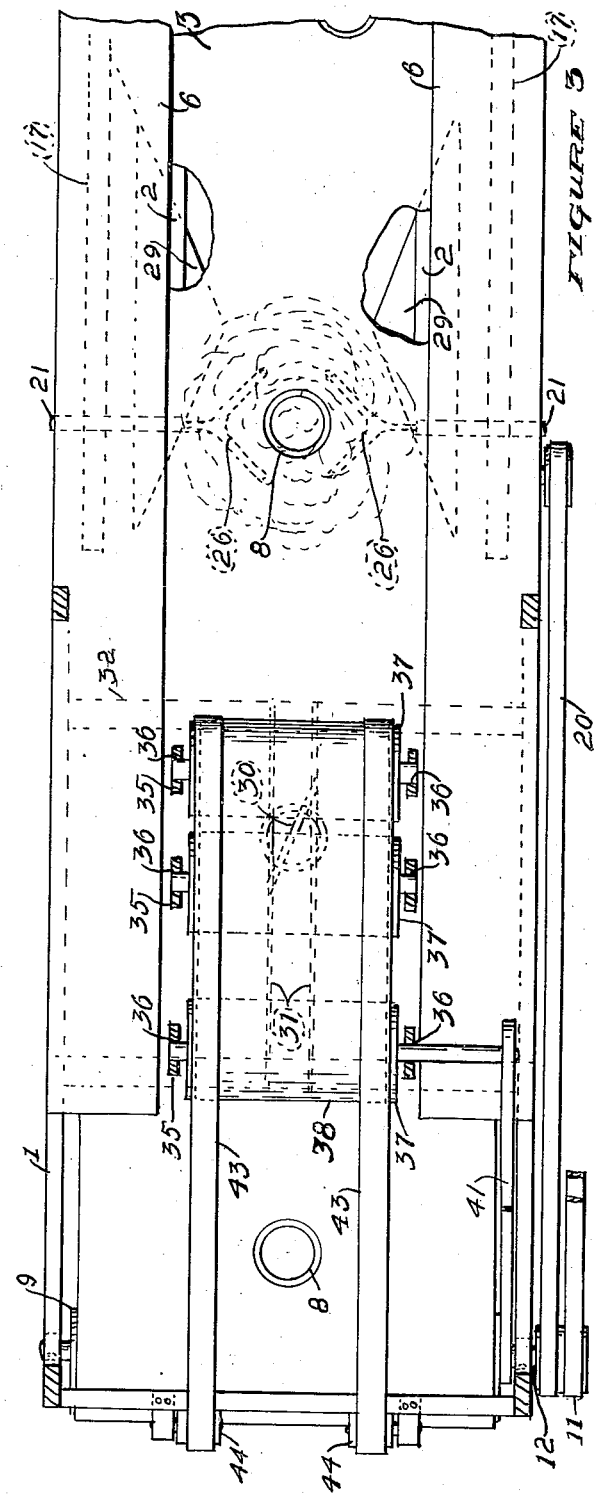
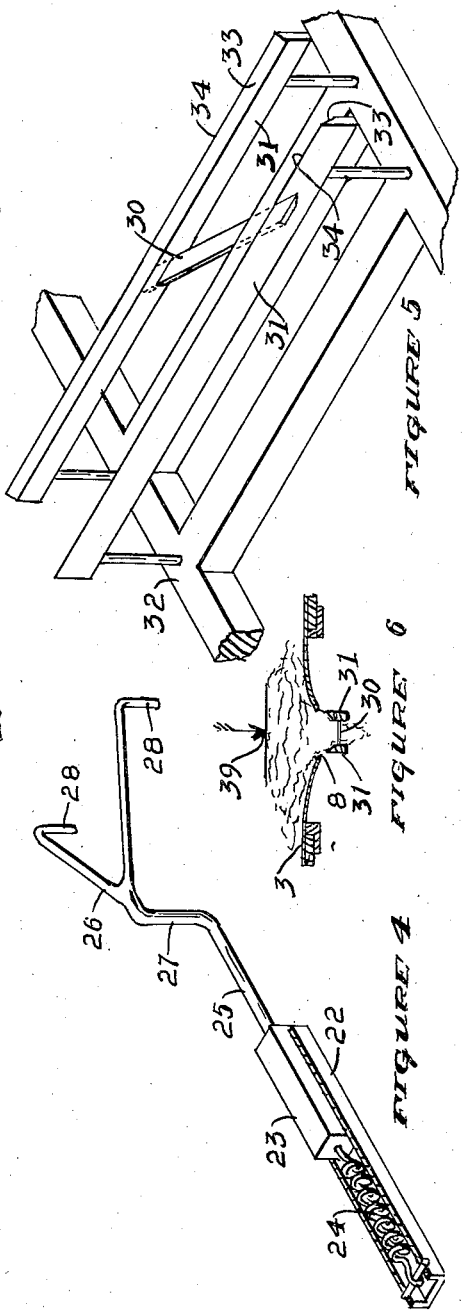
INVENTOR
Newton H. Schneider
John A. Naismith
ATTORNEY Patented Dec. 26, 1939

2,184,889

UNITED STATES PATENT OFFICE 2,184,889

LETTUCE TRIMMER

Newton H. Schneider, Salinas, Calif.

Application November 22, 1937, Serial No. 175,813

7 Claims. (Cl. 146—31)

In the harvesting of lettuce it is customary to remove the entire plant from the soil and then trim away the root and the large leaves around the solid head, and the packing sheds, the entire trimming operation being done by hand.

It is the object of the present invention to provide a machine constructed and arranged to receive the lettuce heads and automatically trim the same ready for packing.

It is also an object of the invention to provide a machine of the character indicated that will be economical to manufacture, simple in form and construction and mode of operation, and highly efficient in its practical application.

In the drawings:

Figure 1 is a side elevation of a machine embodying my invention, with parts broken away.

Figure 2 is a sectional view on line 2—2 of Figure 1.

Figure 3 is a plan view of the machine on line 3—3 of Figure 1.

Figure 4 is a perspective illustration of one of the head straightening devices, partly in section.

Figure 5 is a perspective illustration of the gauge and butt trimming member.

Figure 6 is an illustration showing the method of operation of the gauge.

In the particular form of the invention herein disclosed, 1 indicates the supporting frame generally, and 2—2 spaced parallel track members for supporting the belt 3. The members 2—2 have shoulders as at 4 formed thereon, and the belt has a part 5 provided on its under side along each edge to engage the shoulders 4, and thereby support the intermediate portion of the belt under the desired tension. The belt edge portions are held in sliding engagement with the shoulders by overlying top members 6. Each side part 5 of the belt extends outwardly beyond the underlying member 2, and this overhanging portion is provided with equally spaced lugs as indicated at 7 for the purpose hereinafter described.

The belt 3 has a central row of equally spaced pockets or holes 8 formed therein, and in which the butt ends of the lettuce heads are placed. The belt operates over end rollers, one of which is indicated at 9, the top portion lying in a horizontal plane, and the roller being driven from a motor as 10 by means of belt 11 and shaft 12 in bearings 13.

In order to accomplish the desired trimming in a satisfactory manner it is necessary that each head be disposed vertically in its respective pocket, and to positively position each head before it reaches the trimming knife the following mechanism is provided.

On a suitable support as 14 disposed beneath the belt 3 in parallel relation thereto, are mounted a pair of shafts 15. These shafts extend crosswise of the belt and are fitted with sprockets as at 16 which in turn carry chains 17, the several parts being so arranged that the chains lie directly beneath the lugs 7 on belt 3, and the upper portions of the chains sliding on guides as 18 to move in parallel relation to the overlying belt portions.

On each chain are mounted a number of outwardly extending fingers 19, the spacing of these fingers being equal to the spacing of the lugs 7. A belt drive 20 from shaft 12 to one shaft 15 moves the fingers at the same speed and in the same direction as the belt 3, the arrangement of the several parts being such that as each finger travels upwardly around the rear sprocket it assumes a vertical position and contacts one of the lugs 7.

Mounted on each chain are also several straightening devices, indicated generally at 21, these devices being spaced apart exactly as the pockets 8 in belt 3. Each straightening device on one chain is placed exactly opposite a similar device on the other chain.

Each straightening device comprises a tube as 22 fixedly mounted on the chain and projecting inwardly toward the center line of the belt. In the tube is placed a sliding member 23, held against rotation relative to the tube and connected to the outer end of the tube by a spring 24 which normally pulls the member inwardly thereof. Projecting from the forward end of the sliding member 23 is a forked member 25. This member is offset near the base of the fork 26 as at 27, and the ends 28 of the fork are turned at an angle to form blunt ends that will not catch on the lettuce heads.

Mounted on each member 2 is a cam 29, the two cams being exactly opposite each other with their cam edges directed inwardly toward the center of the belt as shown.

The relative proportions of the cams, the straightening devices, and the cooperating parts, are such that as two opposing straightening devices move upwardly over the rear sprockets 16 and are carried forwardly in a horizontal plane, the parts 27 engage the cams 29 and the two forks 26 are pushed toward each other. By the time the forks are pushed forwardly to their fullest extent they overlap as shown in Figure 2 and the butt end of the lettuce head therebetween is positively positioned upon a vertical axis. In the continued forward movement of the straightening devices they pass over the peaks of the cams 29 and are drawn apart by the action of springs 24 and returned to their normal positions.

The butt trimming knife 30 is mounted angularly upon a pair of spaced, parallel, gauge bars 31, which are in turn mounted upon frame 1 as at 32 in parallel relation to the horizontal plane of the belt 3 and on either side of its median line. These gauge members are bevelled outwardly on their upper edges as at 33 to form cutting edges 34.

Rigidly mounted upon the general framework 1 and overlying the belt 3, are a number of brackets 35, each bracket having vertically disposed guides 36 therein in which are journaled rollers as 37. Each roller is disposed crosswise of the belt and over its median line, and is free to move upwardly in guides 36. In the present case three rollers are shown and a belt 38 is mounted on the rollers as shown.

When a head of lettuce is moved forwardly from the straightening devices the butt end passes in between the bars 31 and the leafy head passes under the rollers 37, and the belt 38. The rollers 37 are sufficiently heavy to press the head downwardly and causing it to seat firmly on the bars 31. The belt 3 is of selected material that offers some resistance to the downward pressure, yet permits the said pressure to depress it sufficiently to seat the head as described. Since lettuce heads all come within a somewhat definite range of sizes it follows that by means of the arrangement described all of the heads passed through the machine will be similarly trimmed.

The operation above described is diagrammatically illustrated in Figure 6, where it is shown that the pressure of the rollers at 39 not only presses the head into the pocket 8 but also depresses the central part of the belt 3 until the head rests upon the bars 31 where the butt end is cut by knife 30.

To trim all of the heads uniformly it is, of course, necessary that each head is properly seated on the gauge bars 31. It will occur, however, more or less frequently, that a head of lettuce will be so placed that the heavy rib of a large outer leaf will rest upon a bar 31 and prevent the head from becoming properly seated. In such a case the edge 34 will cut through the rib and permit the head to take its proper position on the gauge bars.

In the embodiment of the invention disclosed the belt 38 is caused to travel in the direction indicated by the arrow 40 by belt drive 41 from shaft 12, the take-up device at 42 being provided to maintain necessary driving tension in the belt under varying movement of the rollers.

The next step in the trimming of the lettuce head is the removal of the loose green leaves that encompass the solid head desired for packing. This is accomplished by mounting two narrow belts as 43 on the two side edges of belt 38 and on rollers as 44 mounted on the front end of frame 1. These belts 43 will, in actual practice, contact the belt 3 throughout their forward lower portions, and will extend a distance beyond the forward end of belt 3 as shown, and are driven in the direction indicated by arrow 45 by means of the belt 38 and rollers 37.

It is clear from the foregoing, that when the lettuce head passes under belt 38 the two belts 43 will engage the top of the head on either side of the center. When the head passes from under the belt 38 and the rollers drop to their normal positions, then the belts 43 are pressed downwardly and they bend the loose leaves under them down and flatten them out on belt 3.

The result of this operation is that when the lettuce head reaches the end of belt 3 all of the leaves pressed down by belts 43 will fall away and the completely trimmed head may be picked up and carried away for sizing and packing by other devices not shown.

Since it is by means of the devices on chain 17 that the lettuce heads are properly positioned in pockets 8 it is necessary that the chain and belt be perfectly coordinated at all times. This coordination is secured by means of the lug 7-finger 19 construction because through them the chain will always automatically adjust itself to the belt 3 regardless of any lost motion that may occur in the driving mechanisms.

It is to be understood, of course, that while I have herein shown and described but one specific embodiment of the invention, changes in form, construction, and method of assembly and operation may be made within the scope of the appended claims.

I claim:

1. A lettuce trimming machine comprising, a resilient conveyor provided with supports along both side edges adapted to place the conveyor under lateral tension, said conveyor being provided with a succession of openings along its median line in which lettuce heads may be placed with their butt ends projecting therethrough, gauge means disposed below the conveyor, and presser means disposed above the conveyor and adapted to press the heads downwardly into engagement with the gauge means against the resistance of the conveyor.

2. A lettuce trimming machine comprising, a conveyor belt provided with a succession of openings in which lettuce heads may be placed with their butt ends projecting therethrough, presser means mounted over the conveyor to engage the lettuce heads and press them into their seats, leaf stripping devices mounted on either side of the openings in the conveyor and above the same and extending forwardly of the presser means and inclined downwardly to points adjacent the discharge end of the conveyor whereby to engage the loose side leaves of the heads and lay them down upon the conveyor, and cutting means disposed to engage the loose side leaf ribs and sever the same.

3. A lettuce trimming machine comprising, resilient conveyor means provided with a succession of openings in which lettuce heads may be seated with their butt ends projecting therethrough, gauge members disposed immediately below the conveyor and on either side of the openings therein and having their upper edges sharpened to form cutting edges for cutting the bottom leaf ribs to permit the head to seat on the gauge members, and presser means disposed over the conveyor to engage the heads passing thereunder and press the same into their seats and on to the gauge members.

4. A lettuce trimming machine comprising resilient conveyor means provided with a succession of openings in which lettuce heads may be seated with their butt ends projecting therethrough, gauge members disposed immediately below the conveyor and on either side of the openings therein and having sharpened upper edges to form cutting edges for cutting the bottom leaf ribs to permit the head to seat on the gauge members, presser means mounted over the conveyor to engage the lettuce heads and press them into their seats and on to the gauge members, and leaf stripping devices mounted on either side of the openings in the conveyor and above the same and extending forwardly of the presser means and inclined downwardly to points adjacent the discharge end of the conveyor whereby to engage the loose cut side leaves of the heads and remove them from the heads.

5. A lettuce trimming machine comprising, in combination, a conveyor belt having aligned openings formed therein in which lettuce heads may be placed with their butt ends projecting therethrough, cooperating travelling belt means disposed below and in opposed relation to a portion of the first belt to straddle the projecting butt ends, drive means connected to the belts operative to actuate their opposing portions at uniform speeds in the same direction, a pair of axially aligned opposed forked members slidably mounted on the second belt means and movable into and out of overlapping relationship, extensible means connected to said members to normally support the same in nonoverlapping relationship, and supporting means therefor, and means operative to move said members into overlapping relationship to engage the butt ends of the lettuce to move them into a predetermined position relative to the first belt.

6. A lettuce trimming machine comprising, in combination, a conveyor belt having spaced and aligned openings formed therein in which lettuce heads may be placed with their butt ends projecting therethrough, cooperating travelling belt means disposed below and in opposed relation to a portion of the first belt to straddle projecting butt ends, lettuce head position correcting devices mounted on the second belt means operative to engage each butt end and align the same with the axis of the opening in which it is placed and spaced similarly to the openings in the first belt, means for driving the opposed portions of the belts at the same speed in the same direction, means inserted between the belts operative to effect and maintain the positioning devices and the openings in the first belt in predetermined relationship, and actuating means for the positioning devices.

7. A lettuce trimming machine comprising, a resilient conveyor belt having aligned openings formed therein in which lettuce heads may be placed with their butt ends projecting therethrough, positioning devices mounted beneath the belt operative to engage each butt end and align the same with the axis of the opening in which it is placed, gauge members disposed beneath the belt in parallel relation thereto in advance of the positioning devices and disposed and spaced to receive the positioned butts therebetween, presser means overlying the conveyor and gauge members and disposed to engage the heads passing thereunder and press the same into their seats and on to the gauge members with their butt ends suspended between the gauge members, cutting means disposed crosswise of the gauge members and in th path of travel of the suspended butt ends to sever the same from the heads, and leaf stripping devices mounted on either side of the openings in the conveyor and above the same and extending forwardly of the presser means and gauge members and inclined downwardly to points adjacent the conveyor whereby to engage the loose side leaves of the heads and lay them down upon the conveyor.

NEWTON H. SCHNEIDER.